US012761027B2

(12) United States Patent
Zhang et al.

(10) Patent No.: US 12,761,027 B2
(45) Date of Patent: Oct. 13, 2026

(54) PATH CONSTRUCTION METHOD AND APPARATUS, TERMINAL, AND STORAGE MEDIUM

(71) Applicants: ZHEJIANG GEELY HOLDING GROUP CO., LTD, Hangzhou (CN); NINGBO GEELY AUTOMOBILE RESEARCH AND DEVELOPMENT CO., LTD, Ningbo (CN)

(72) Inventors: Jianfeng Zhang, Ningbo (CN); Xiao Lin, Ningbo (CN); Zhiqiang Yuwen, Ningbo (CN)

(73) Assignees: ZHEJIANG GEELY HOLDING GROUP CO., LTD, Hangzhou (CN); NINGBO GEELY AUTOMOBILE RESEARCH AND DEVELOPMENT CO., LTD, Ningbo (CN)

( * ) Notice: Subject to any disclaimer, the term of this patent is extended or adjusted under 35 U.S.C. 154(b) by 216 days.

(21) Appl. No.: 18/276,332

(22) PCT Filed: Feb. 8, 2021

(86) PCT No.: PCT/CN2020/137305

§ 371 (c)(1),
(2) Date: Aug. 8, 2023

(87) PCT Pub. No.: WO2022/165614

PCT Pub. Date: Aug. 11, 2022

(65) Prior Publication Data

US 2024/0133696 A1 Apr. 25, 2024

(51) Int. Cl.
*G01C 21/30* (2006.01)
*G01C 21/00* (2006.01)
(Continued)

(52) U.S. Cl.
CPC ......... *G01C 21/30* (2013.01); *G01C 21/3833* (2020.08); *G06T 7/11* (2017.01);
(Continued)

(58) Field of Classification Search
CPC ................ G01C 21/30; G01C 21/3833; G01C 21/3484; G01C 21/3492; G01C 21/3804;
(Continued)

(56) References Cited

U.S. PATENT DOCUMENTS 6,025,790 A 2/2000 Saneyoshi
2018/0373263 A1* 12/2018 Gray ...................... G06V 20/58
2020/0001875 A1* 1/2020 Kato .................. G01C 21/3602

FOREIGN PATENT DOCUMENTS

CN 108388641 A 8/2018
CN 111325799 A 6/2020
(Continued)

OTHER PUBLICATIONS

CN-112212872-B Translation (Year: 2022).*
(Continued)

*Primary Examiner* — Kenneth J Malkowski
*Assistant Examiner* — Ibrahim Abdoalatif Alsomairy

(57) ABSTRACT

The present disclosure discloses a path construction method, device, terminal and storage medium, and the method comprises: acquiring vehicle travel state information and an initial image of a surrounding environment of a preset driving path corresponding to the vehicle travel state information in real time when the vehicle is traveling on the preset driving path; calculating a target top view corresponding to the initial image via a nonlinear difference correction algorithm according to the initial image; inputting the target top view into a preset deep learning model, and classifying pixel points of the target top view input into the preset deep learning model to obtain a partitioned image, the partitioned
(Continued)

image being an image after partitioning the target top view; scanning the partitioned image to recognize a travelable region of the vehicle; generating a path trajectory corresponding to the vehicle travel state information based on the travelable region.

16 Claims, 11 Drawing Sheets

(51) Int. Cl.

| | |
|---|---|
| ***G06T 7/11*** | (2017.01) |
| ***G06T 7/246*** | (2017.01) |
| ***G06V 10/75*** | (2022.01) |
| ***G06V 10/764*** | (2022.01) |
| ***G06V 10/77*** | (2022.01) |
| ***G06V 10/82*** | (2022.01) |
| ***G06V 20/56*** | (2022.01) |
| ***G07C 5/02*** | (2006.01) |

(52) U.S. Cl.
CPC ............ *G06T 7/248* (2017.01); *G06V 10/751* (2022.01); *G06V 10/764* (2022.01); *G06V 10/7715* (2022.01); *G06V 10/82* (2022.01); *G06V 20/588* (2022.01); *G07C 5/02* (2013.01); *G06T 2207/20084* (2013.01); *G06T 2207/30241* (2013.01); *G06T 2207/30256* (2013.01)

(58) Field of Classification Search
CPC ....... G01C 21/3602; G06T 7/11; G06T 7/248; G06T 2207/20084; G06T 2207/30241; G06T 2207/30256; G06V 10/751; G06V 10/764; G06V 10/7715; G06V 10/82; G06V 20/588; G06V 20/58; G07C 5/02; G06N 3/08; G06N 3/045
See application file for complete search history.

(56) References Cited

FOREIGN PATENT DOCUMENTS

| | | | | | |
|---|---|---|---|---|---|
| CN | 111753639 A | | 10/2020 | | |
| CN | 112212872 A | | 1/2021 | | |
| CN | 112270306 A | | 1/2021 | | |
| CN | 108388641 B | * | 2/2022 | ............. | G06V 20/54 |
| CN | 112212872 B | * | 3/2022 | ............. | G06N 3/045 |
| CN | 108959321 B | * | 6/2022 | | |
| KR | 20180062504 A | * | 6/2018 | ............. | G08G 1/141 |

OTHER PUBLICATIONS

KR-20180062504-A Translation (Year: 2018).*
CN-108959321-B Translation (Year: 2022).*
CN-108388641-B Translation (Year: 2022).*
International Search Report of PCT/CN2020/137305.
Written Opinion of PCT/CN2020/137305.

* cited by examiner

PATH CONSTRUCTION METHOD AND APPARATUS, TERMINAL, AND STORAGE MEDIUM

CROSS-REFERENCE TO RELATED APPLICATION

This application claims priority from PCT Application No. PCT/CN2020/137305, filed Feb. 8, 2021, the content of which is incorporated herein in the entirety by reference.

TECHNICAL FIELD

The present disclosure relates to the field of automatic driving vehicle self-learning technology, and more particularly to a path construction method, device, terminal and storage medium.

BACKGROUND

With the development of automobile intelligence, auto-driving is getting closer and closer to us. As the last loop of auto-driving, "the last kilometer" is at low speed and relatively closed scene. The driving risk is relatively low, which brings high convenience and comfort to users, so it is very likely to come in advance.

At present, many automatic parking schemes in underground garages are loaded into the garage map in advance, such schemes need to record the garage map in advance. Only making enough garage maps can make it possible to be used in a large range, and the former cost is large. Another approach is to provide parking path planning through a garage parking introduction and guidance system that also requires the installation of identification and communication equipment in a large number of garages, maintenance and upgrades of the equipment, and significant human and material expenditure.

SUMMARY

In order to solve the mentioned technical problem, in view of the above-mentioned problem, the present disclosure discloses a path construction method, in which a vehicle automatically learns to obtain a path trajectory during driving on a preset driving path in an underground garage, so that a subsequent vehicle automatically plans a path during automatic driving.

In order to achieve the object, the present disclosure provides a path construction method comprising:

the method comprising:

acquiring vehicle travel state information and an initial image of a surrounding environment of a preset driving path corresponding to the vehicle travel state information in real time when the vehicle is traveling on the preset driving path;

calculating a target top view corresponding to the initial image via a nonlinear difference correction algorithm according to the initial image;

inputting the target top view into a preset deep learning model, and classifying pixel points of the target top view input into the preset deep learning model to obtain a partitioned image, the partitioned image comprising a travelable region image and a non-travelable region image;

scanning the partitioned image to recognize a travelable region of the vehicle;

generating a path trajectory corresponding to the vehicle travel state information based on the travelable region, the path trajectory being one of the preset driving paths.

In one embodiment, generating a path trajectory corresponding to the vehicle travel state information based on the travelable region further comprises:

constructing a map corresponding to the preset driving path based on the path trajectory.

In one embodiment, acquiring vehicle travel state information and an initial image of a surrounding environment of a preset driving path corresponding to the vehicle travel state information in real time comprises:

acquiring the vehicle travel state information when the vehicle is traveling on the preset driving path in real time, the vehicle travel state information including a travel strategy when the vehicle is traveling on the preset driving path and a driving habit of a driver;

acquiring the initial image of the surrounding environment of the preset driving path when the vehicle is traveling on the preset driving path in real time according to the travel strategy and the driving habit of the driver.

In one embodiment, the travelable region includes a travelable road and a travelable intersection, and acquiring the travel strategy when the vehicle is traveling on the preset driving path comprises:

acquiring a vehicle speed and a steering wheel angle of the vehicle in real time;

determining a driving range and a heading angle of the vehicle based on the vehicle speed and the steering wheel angle of the vehicle;

determining the travel strategy of the vehicle from the driving range and the heading angle of the vehicle, the travel strategy of the vehicle including the driving range on the drivable road and whether to turn at the drivable intersection.

In one embodiment, the travelable region includes a travelable road and a travelable intersection; acquiring the driving habit of the driver when the vehicle is traveling on the preset driving path includes:

acquiring operation data when the vehicle is traveling on the preset driving path in real time;

pre-processing the operation data of the vehicle to obtain target operation data;

inputting the target operation data into a cyclic neural network, and extracting features of the target operation data from the cyclic neural network;

inputting the features into a full connection network, and predicting a driving habit of a driver when the vehicle is traveling on the preset driving path; the driving habit including a traveling speed on a travelable road and a steering angle at a travelable intersection.

In one embodiment, the generating a path trajectory corresponding to the vehicle travel state information based on the travelable region further comprises: when the vehicle is traveling on the preset driving path again, acquiring vehicle travel state information and an initial image of a surrounding environment of a preset driving path corresponding to the vehicle travel state information in real time;

calculating a target top view corresponding to the initial image via a nonlinear difference correction algorithm according to the initial image;

inputting the target top view into a preset deep learning model, and classifying pixel points of the target top view input into the preset deep learning model to obtain a partitioned image, the partitioned image comprising a travelable region image and a non-travelable region image;

scanning the partitioned image to recognize a travelable region of the vehicle;

generating a current path trajectory corresponding to the vehicle travel state information based on the travelable region, the path trajectory being one of the preset driving paths.

In one embodiment, generating a current path trajectory corresponding to the vehicle travel state information based on the travelable region further comprises:

performing multi-trajectory fusion on the current path trajectory and the path trajectory obtained the last time, and reconstructing a map corresponding to the preset driving path.

In one embodiment, before performing multi-trajectory fusion on the current path trajectory and the path trajectory obtained the last time, and reconstructing a map corresponding to the preset driving path, the method further comprises:

judging whether the coincidence degree between the current path trajectory and the path trajectory obtained the last time is greater than or equal to a preset first threshold value;

if the coincidence degree between the current path trajectory and the path trajectory obtained the last time is greater than or equal to the preset first threshold value, fusing the current path trajectory and the path trajectory obtained the last time.

In one embodiment, the method further comprises:

if the coincidence degree between the current path trajectory and the path trajectory obtained the last time is less than a preset first threshold value, determining whether a matching degree between the current path trajectory and the preset driving path is less than a matching degree between the path trajectory obtained the last time and the preset driving path;

if so, regenerating the current path trajectory.

In one embodiment, the calculating a target top view corresponding to the initial image via a nonlinear difference correction algorithm according to the initial image comprises:

obtaining a target image based on the initial image, the target image comprising a top view of a region image coinciding with a region in which the target top view is located;

acquiring a number of times the target image appears;

judging whether the number of times the target image appears is greater than or equal to a preset second threshold value;

if so, extracting a feature point of the region image in each of the target images;

matching the feature points of each of the region images to reconstruct the target top view.

In one embodiment, the calculating a target top view corresponding to the initial image via a nonlinear difference correction algorithm according to the initial image further comprises:

acquiring a corresponding relationship between a top view of the initial image and the initial image based on the non-linear difference correction algorithm, the corresponding relationship comprising corresponding coordinate points between the top view of the initial image and the initial image;

acquiring a target coordinate point from the initial image based on the corresponding relationship;

constructing a target top view corresponding to the initial image based on the target coordinate point.

In one embodiment, the travelable region includes a travelable road and a travelable intersection, and after generating a path trajectory corresponding to the vehicle travel state information based on the travelable region. The method comprises:

determining the travelable road, the travelable intersection, and a distribution of the travelable road and the travelable intersection in the travelable region based on the travelable region;

generating a path trajectory corresponding to the vehicle travel state information based on the distribution of the travelable road and the travelable intersection.

In one embodiment, before recognizing the travelable road, the travelable intersection, and the distribution of the travelable road and the travelable intersection in the travelable region, the method further comprises:

scanning the partitioned image using a grid with a preset size to obtain the travelable region and a scanned region of the vehicle;

adjusting the travelable region based on the scanned region, and reconstructing the travelable region.

In one embodiment, adjusting the travelable region based on the scanned region, and reconstructing the travelable region comprises:

performing an inflation operation on the travelable region based on the scanned region to obtain an inflation region;

performing a corrosion operation on the inflation region based on the scanned region, and reconstructing the travelable region.

In one embodiment, the recognizing the travelable road, the travelable intersection, and the distribution of the travelable road and the travelable intersection in the travelable region comprises:

inputting the travelable region into a road recognition model, recognizing the travelable road in the travelable region and information about the travelable road, the information about the travelable road including a width and a length of the travelable road;

inputting the travelable region into an intersection recognition model, and recognizing the travelable intersection in the travelable region and a type of the travelable intersection;

determining a distribution of the travelable road and the travelable intersection in the travelable region based on the travelable region and the information about the travelable road in the travelable region and the type of the travelable intersection.

The present disclosure also provides a path construction device comprising:

a first acquisition module for acquiring vehicle travel state information and an initial image of a surrounding environment of a preset driving path corresponding to the vehicle travel state information in real time when the vehicle is traveling on the preset driving path;

a target top view acquisition module for calculating a target top view corresponding to the initial image via a nonlinear difference correction algorithm according to the initial image;

a partitioned image acquisition module for inputting the target top view into a preset deep learning model, and classifying pixel points of the target top view input into the preset deep learning model to obtain a partitioned image, the partitioned image comprising a travelable region image and a non-travelable region image;

a recognition module for scanning the partitioned image to recognize a travelable region of the vehicle;

a path trajectory generation module for generating a path trajectory corresponding to the vehicle travel state information based on the travelable region, the path trajectory being one of the preset driving paths.

The present disclosure further provides a path construction terminal, wherein the terminal comprises a processor and a memory, the memory having stored therein at least one instruction or at least one piece of program, the at least one instruction or the at least one piece of program being loaded and executed by the processor to implement the path construction method as described above.

The present disclosure further provides a computer-readable storage medium wherein the storage medium has at least one instruction or at least one piece of program stored therein, the at least one instruction or the at least one piece of program being loaded and executed by the processor to implement the path construction method as described above.

The embodiments of the present disclosure have the following advantageous effects:

The path construction method disclosed in the present disclosure automatically learns to obtain a path trajectory by a vehicle during driving on a preset driving path in an underground garage, so that a subsequent vehicle automatically plans a path during automatic driving.

BRIEF DESCRIPTION OF THE DRAWINGS

In order to explain the path construction method, device, system and terminal of the present application more clearly, the following contents will briefly introduce the drawings which need to be used in the embodiments, and it would be obvious for a person skilled in the art that the following description is only some embodiments of the present disclosure and it is possible to obtain other drawings according to these drawings without involving any inventive effort.

DETAILED DESCRIPTION OF THE DISCLOSURE

The embodiments of the present disclosure will now be described more clearly and fully hereinafter with reference to the accompanying drawings, in which embodiments of the disclosure are shown. It is to be understood that the embodiments described are only a few, but not all embodiments of the disclosure. Based on the embodiments of the present disclosure, all other embodiments obtained by a person of ordinary skill in the art without inventive effort fall within the scope of the present disclosure.

It is noted that the terms "first", "second", and the like in the description and in the claims, and in the above-described figures, are used for distinguishing between similar objects and not necessarily for describing a particular sequential or chronological order. It is to be understood that the data so used are interchangeable under appropriate circumstances such that the embodiments of the disclosure described herein are capable of operation in sequences other than those illustrated or otherwise described herein. Furthermore, the terms "comprising" and "having", as well as any variations thereof, are intended to cover a non-exclusive inclusion, such that a process, method, system, article, or server that comprises a list of steps or elements is not necessarily limited to those steps or elements expressly listed, but may include other steps or elements not expressly listed or inherent to such process, method, article, or device.

The path construction method of the present application is applied to the field of automatic driving, and specifically uses a human-driven vehicle to travel in an underground garage at least once so that the vehicle automatically learns the path of the underground garage, and then establishes an abstract path map so as to facilitate subsequent vehicles to automatically drive according to the path map.

The path construction method of the present disclosure based on the system, which can be applied to a path construction method of an automatic driving vehicle, is described below in conjunction with FIG. 1. The present disclosure can be applied to a sealed scene, such as an underground garage, but is not limited thereto, and is a method for constructing a virtual map of an underground garage based on path automatic learning.

Figure 1:
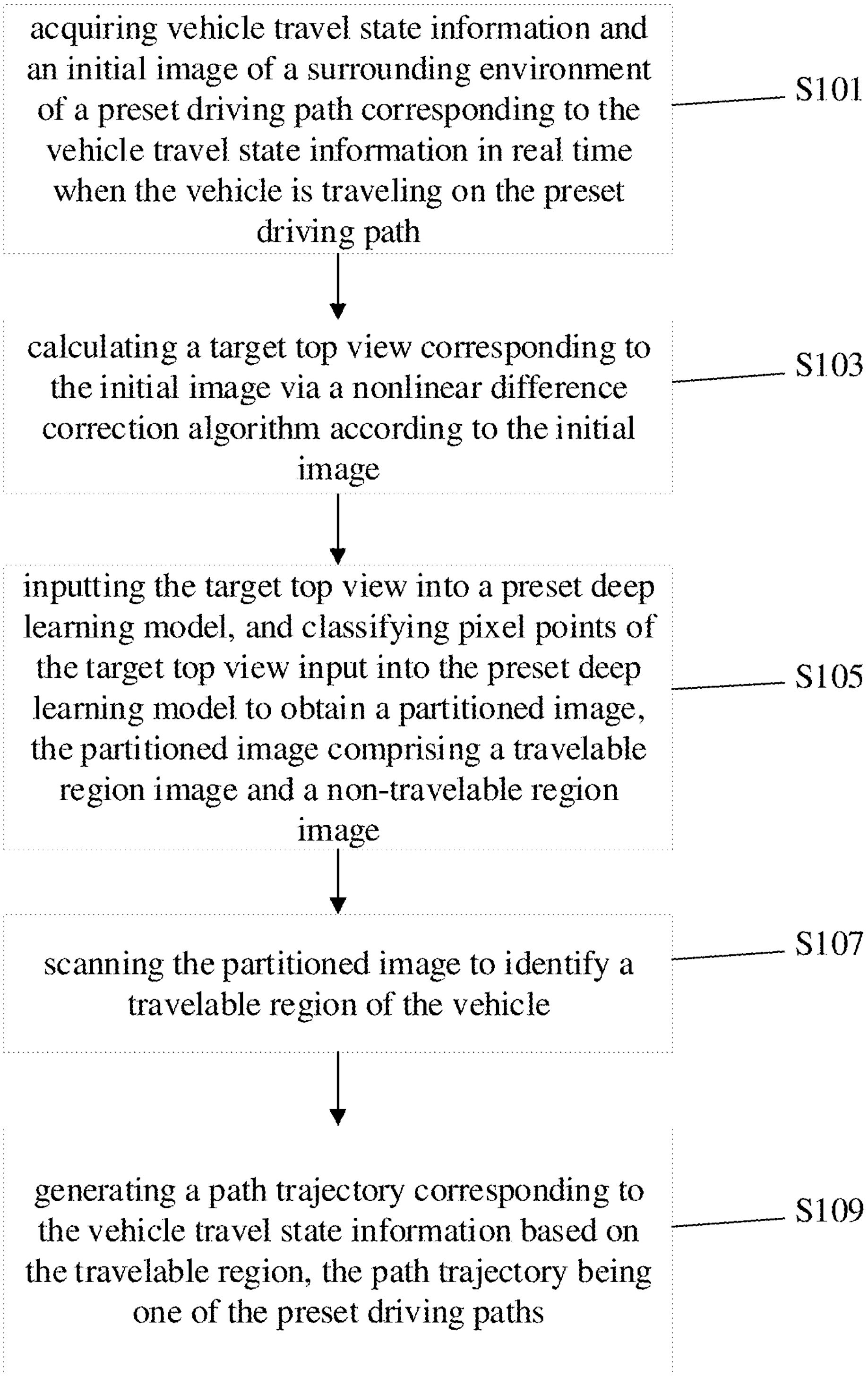
FIG. 1 is a schematic flow diagram of the path construction method according to an embodiment of the present disclosure.

With reference now to FIG. 1, there is shown a schematic flow diagram of a path construction method according to an embodiment of the present disclosure. The description provides the steps of the method according to the embodiment or flowchart, but on a general basis. Or the non-inventive effort may include more or less operational steps. The order of steps recited in an embodiment is merely one manner of sequence of steps and does not represent a unique order of execution, a method of path construction, and may be performed in the order of methods illustrated in the embodiments or figures. Specifically, as shown in FIG. 1, the method comprises:

S101, acquiring vehicle travel state information and an initial image of a surrounding environment of a preset driving path corresponding to the vehicle travel state information in real time when the vehicle is traveling on the preset driving path.

It is to be indicated that in the embodiment of the present specification, it is possible to run the automatic driving vehicle on the preset driving path by the driver's human driving.

The preset driving path may be a path that is travelable and already existing in the preset driving region; for example, at least one of a travelable road and a travelable intersection already existing in an underground garage.

In the embodiment of the present specification, the initial image of the surrounding environment of the preset driving path corresponding to the vehicle travel state information may be acquired in real time by means of the vehicle's forward looking camera;

Specifically, the initial image may be a two-dimensional image.

Figure 2:
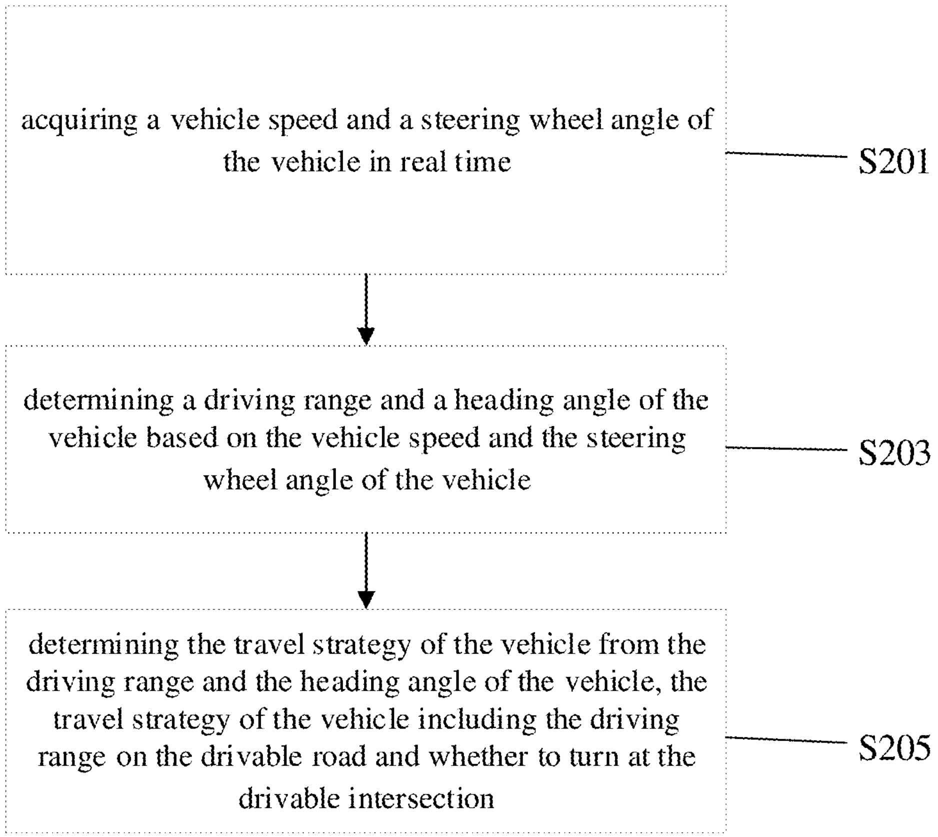
FIG. 2 is a schematic flow diagram for acquiring a vehicle travel strategy according to an embodiment of the present disclosure.

Specifically, when a driver drives a vehicle to travel on a preset driving path, the vehicle automatically acquires vehicle travel state information and an initial image of a surrounding environment of a preset driving path corresponding to the vehicle travel state information in real time when the vehicle is traveling on the preset driving path;

In one embodiment, acquiring vehicle travel state information and an initial image of a surrounding environment of a preset driving path corresponding to the vehicle travel state information in real time comprises the following steps:

Step 1, acquiring the vehicle travel state information when the vehicle is traveling on the preset driving path in real time, the vehicle travel state information including a travel strategy when the vehicle is traveling on the preset driving path and a driving habit of a driver;

Specifically, in the present specification, reference is made to FIG. 2, which is a schematic flow diagram for acquiring a vehicle travel strategy according to an embodiment of the present disclosure;

In the present specification embodiment, specifically, when the vehicle travel strategy is acquired, the travelable region may include a travelable road and a travelable intersection;

S201, acquiring a vehicle speed and a steering wheel angle of the vehicle in real time.

In the present embodiment, the vehicle speed and the steering wheel angle of the vehicle can be obtained from a vehicle controller area network (CAN) signal.

S203, determining a driving range and a heading angle of the vehicle based on the vehicle speed and the steering wheel angle of the vehicle.

In the present embodiment, the running time of the vehicle can also be acquired, and specifically, the driving range of the vehicle can be calculated from the vehicle speed and the running time of the vehicle; the heading angle of the vehicle can be calculated from the steering wheel angle of the vehicle.

S205, determining the travel strategy of the vehicle from the driving range and the heading angle of the vehicle, the travel strategy of the vehicle including the driving range on the travelable road and whether to turn at the travelable intersection.

In this specification embodiment, the driving tendency of the vehicle, that is, the travel strategy of the vehicle may be determined based on the driving range of the vehicle and the heading angle.

Specifically, the vehicle travel strategy may include travel data and travel demand of a vehicle such as a driving range on the travelable road and whether or not to turn at the travelable intersection.

In the present application, the method for obtaining the vehicle travel strategy can accurately obtain the travel strategy when the vehicle runs on the preset driving path, so as to subsequently obtain an initial image of the surrounding environment of the preset driving path during the vehicle running on the preset driving path according to the travel strategy of the vehicle.

Figure 3:
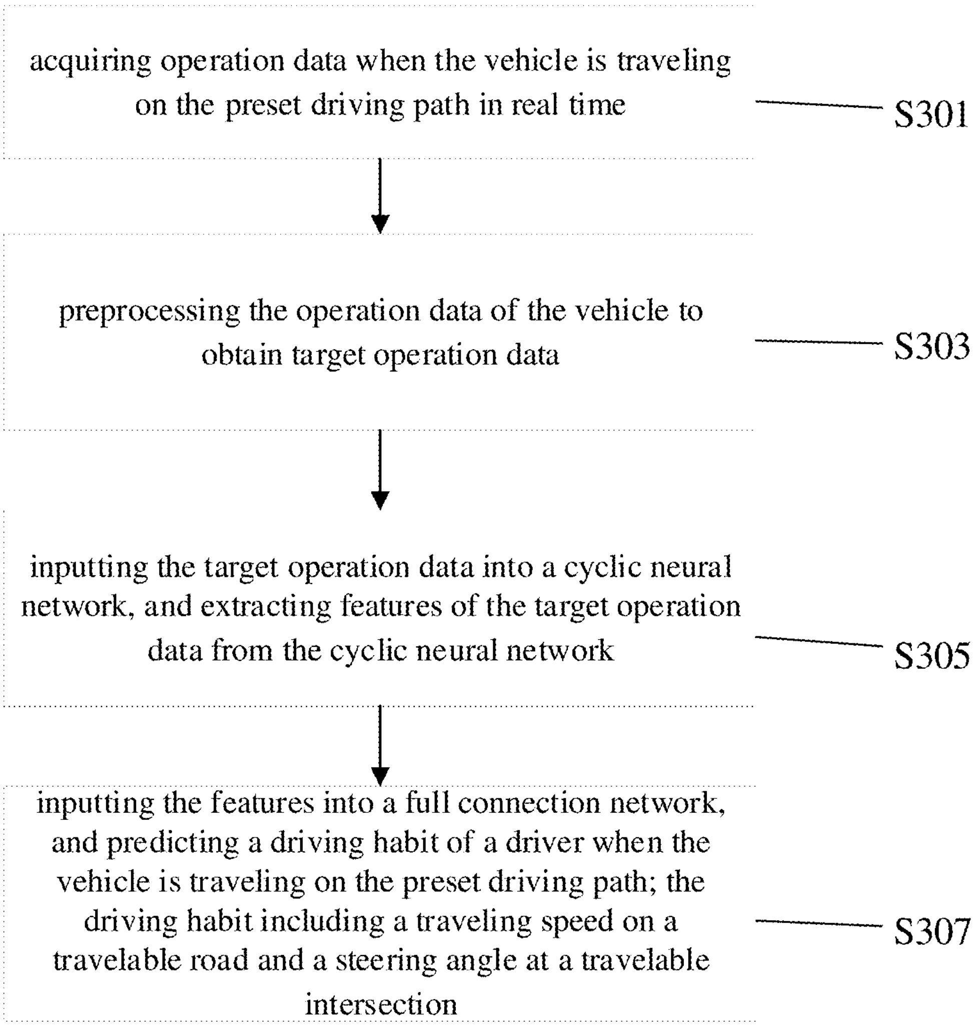
FIG. 3 is a schematic flow diagram for acquiring a driving habit of a driver according to an embodiment of the present disclosure.

Specifically, in the present specification, reference is made to FIG. 3, which is a schematic flow diagram for acquiring a driving habit of a driver according to an embodiment of the present disclosure;

In the present specification embodiment, specifically, when the driving habit of the driver is acquired, the travelable region may include a travelable road and a travelable intersection;

S301, acquiring operation data when the vehicle is traveling on the preset driving path in real time.

In this specification embodiment, the operation data of the vehicle when the vehicle is traveling on the preset driving path may include operation data of the vehicle such as a steering angle of the vehicle, a steering acceleration, a speed of the vehicle, an acceleration of the vehicle, an accelerator pedal, and a brake;

The operation data of the vehicle when the vehicle is traveling on the preset driving path may further comprise a driving video, and specifically, the traveling track of the vehicle may be determined according to the driving video.

Specifically, when acquiring the operation data of the vehicle, it is necessary to establish a time window, in which the operation data of the vehicle before and after the change of the trajectory of the vehicle is acquired;

Specifically, the operation data of the vehicle is also different in different time windows;

S303, pre-processing the operation data of the vehicle to obtain target operation data.

In the embodiment of the present description, pre-processing the vehicle operation data may be pre-processing vehicle operation data obtained within a time window, and specifically may be pre-processing data such as speed, acceleration, steering angle and steering acceleration of the vehicle;

Specifically, the maximum value, the minimum value and the average value of data such as the speed, the acceleration, the steering angle and the steering acceleration of the vehicle may be taken respectively; specifically, the maximum value, minimum value and average value of each operation data obtained are the target operation data.

S305, inputting the target operation data into a cyclic neural network, and extracting features of the target operation data from the cyclic neural network.

In the embodiments of the present description, features of the target operation data may be extracted after the target operation data is acquired.

Specifically, features of the target operation data may be extracted by inputting the target operation data into a cyclic neural network, and extracting features of the target operation data from the cyclic neural network through a sequence-to-sequence model structure (seq2seq);

S307, inputting the features into a full connection network, and predicting a driving habit of a driver when the vehicle is traveling on the preset driving path; the driving habit including a traveling speed on a travelable road and a steering angle at a travelable intersection.

In the present specification embodiment, after extracting a feature of the target operation data, a control feature of the vehicle is preset according to the feature, and the control feature may include a traveling speed of the travelable road and a steering angle of the travelable intersection.

In particular, the driving habits of the driver can be obtained according to the control characteristics of the vehicle during traveling.

In the present application, the manner of acquisition of the driving habit of the driver in the present application is provided such that the driving habits of the driver can be effectively predicted according to the operation data when the vehicle is traveling on the preset driving path, so as to subsequently obtain an initial image of the surrounding environment of the preset driving path when the vehicle is traveling on the preset driving path according to the driving habits of the driver.

Step 2, acquiring the initial image of the surrounding environment of the preset driving path when the vehicle is traveling on the preset driving path in real time according to the travel strategy and the driving habit of the driver.

In the embodiment of the present specification, in the process of acquiring the initial image of the surrounding environment of the preset driving path by the forward looking camera of the vehicle, the obtained initial image corresponds to the travel strategy of the vehicle and the driving habits of the driver.

When the travel strategy of the vehicle and/or the driving habits of the driver are changed, the number of initial images of the surrounding environment of the preset driving path and the viewing angle and pixels of the images obtained are different.

Figure 4:
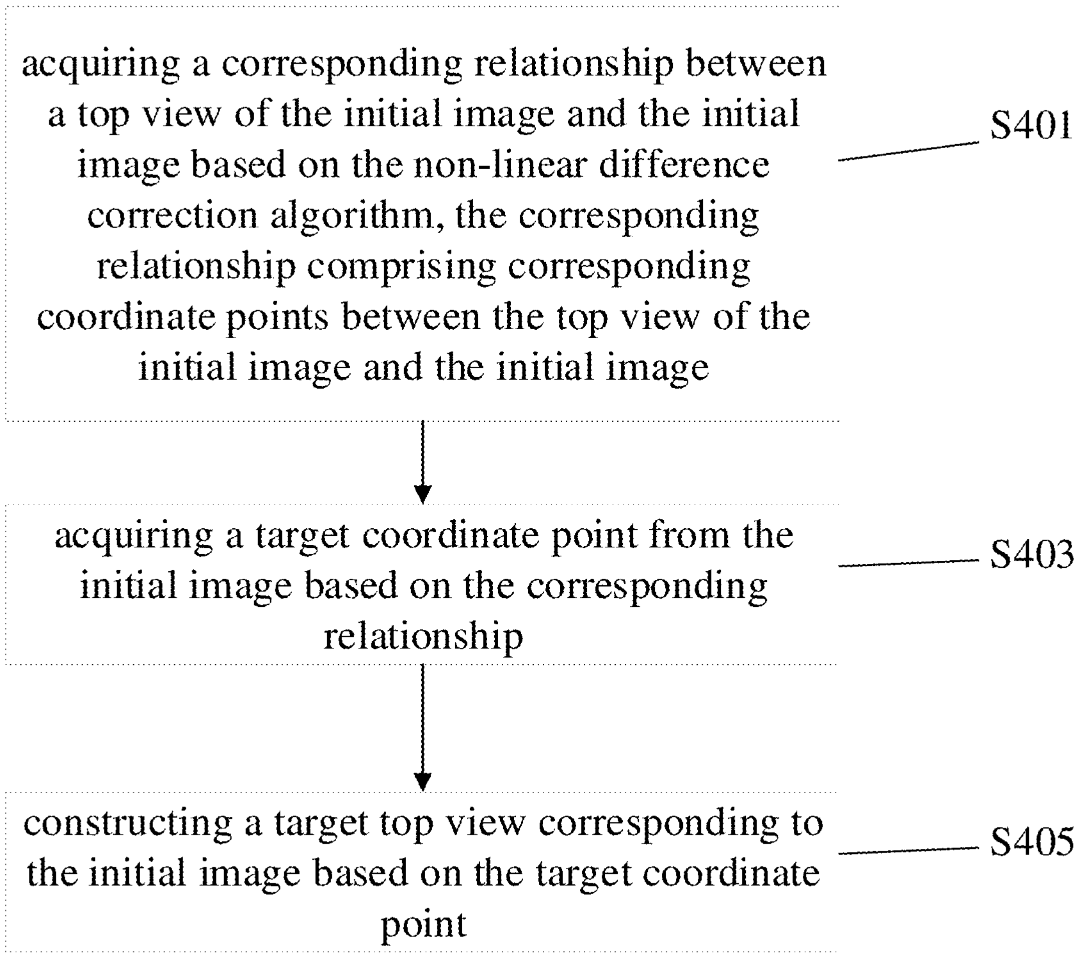
FIG. 4 is a schematic flow diagram of a top view of an acquisition target according to an embodiment of the present disclosure.

S103, calculating a target top view corresponding to the initial image via a nonlinear difference correction algorithm according to the initial image;

In an embodiment of the present disclosure, reference is made to FIG. 4, which is a schematic flow diagram a top view of an acquisition target according to an embodiment of the present disclosure. The details are as follows:

calculating a target top view corresponding to the initial image via a nonlinear difference correction algorithm according to the initial image includes:

S401, acquiring a corresponding relationship between a top view of the initial image and the initial image based on the non-linear difference correction algorithm, the corresponding relationship comprising corresponding coordinate points between the top view of the initial image and the initial image.

Figure 5:
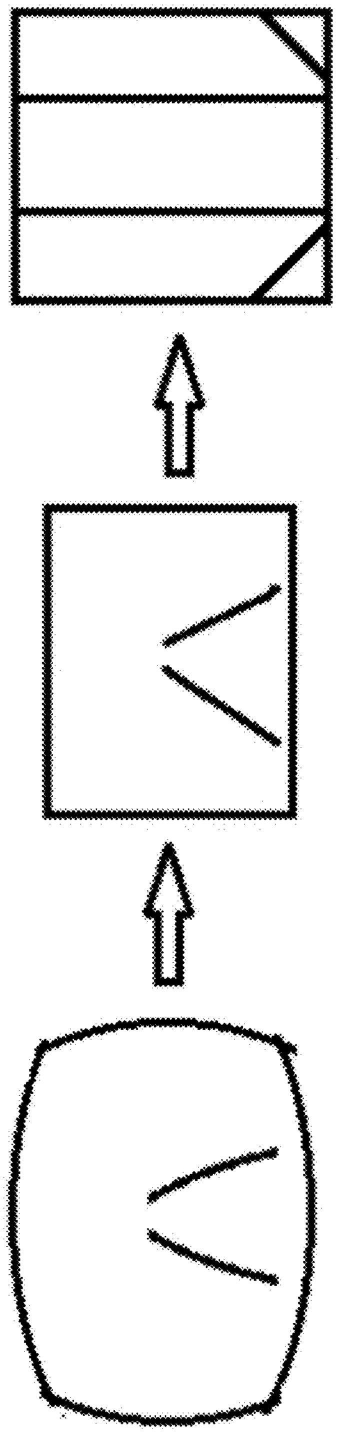
FIG. 5 is a schematic diagram of a top view for acquiring an initial image according to an embodiment of the present disclosure.

In the embodiment of the present description, before acquiring the corresponding relationship between the top view of the initial image and the initial image, further comprises: obtaining a top view of the initial image;

FIG. 5 is a schematic diagram of a top view for acquiring an initial image;

Specific steps of acquiring a corresponding relationship between a top view of an initial image and the initial image are:

performing a de-distortion operation on the initial image to obtain a de-distorted image;

selecting four points in the de-distorted image, and determining a top view of a top view angle of an initial image corresponding to the four points.

recognizing coordinates of each point in the top view, obtaining corresponding coordinates in an initial image by means of a perspective matrix, and then obtaining a corresponding relationship between the top view of the initial image and the initial image.

Specifically, the corresponding relationship may be h(m, n)=f(i,j).

Specifically, a specific algorithm for obtaining a corresponding relationship between a top view and the initial image by setting a perspective matrix is as follows:

Let the perspective matrix be M, then the perspective transformation equation is: P=M·p wherein $$M = \begin{bmatrix} m_{00} & m_{01} & m_{02} \\ m_{10} & m_{11} & m_{12} \\ m_{20} & m_{21} & m_{22} \end{bmatrix}, p = \begin{bmatrix} x \\ y \\ 1 \end{bmatrix}$$

being the coordinate of the midpoint in the top view, $$P = \begin{bmatrix} X \\ Y \\ k \end{bmatrix},$$

(X/k, Y/k) being the coordinate of the corresponding point in the image after distortion removal, $k=m_{20}*x+m_{21}*y+m_{22}$, four sets of points being taken in to find the perspective matrix M. The coordinate of each point in the top view is performed with traversing and recognizing, the coordinate of the corresponding point is obtained through the perspective matrix M, and then pixel information about the coordinate of the initial image is obtained according to h(m,n)=f(i,j).

In an embodiment of the present description, the acquiring a corresponding relationship between a top view of the initial image and the initial image based on the non-linear difference correction algorithm comprises:

acquiring a first pixel point of the above-mentioned obtained top view, and searching for a second pixel point corresponding to the first pixel point in the pixel points of the initial image; a corresponding relationship between a first pixel point and a second pixel point may be a corresponding relationship between a top view of an initial image and the initial image.

Specifically, in the embodiments of the present description, subsequently, when in use, a corresponding relationship between a top view of the initial image and the initial image can be directly acquired based on a non-linear difference correction algorithm, and the corresponding relationship can comprise coordinate points corresponding to the top view and the initial image; in the present application, an object top view of an initial image can be quickly acquired in this manner.

S403, acquiring a target coordinate point from the initial image based on the corresponding relationship.

In the embodiment of the present description, according to the obtained initial image, the target coordinate point corresponding to the target plan view can be directly found in the initial image based on the above-mentioned obtained corresponding relationship.

S405, constructing a target top view corresponding to the initial image based on the target coordinate point.

In the embodiment of the present description, the object plan view corresponding to the initial image can be directly constructed based on the obtained object coordinate points.

Figure 6:
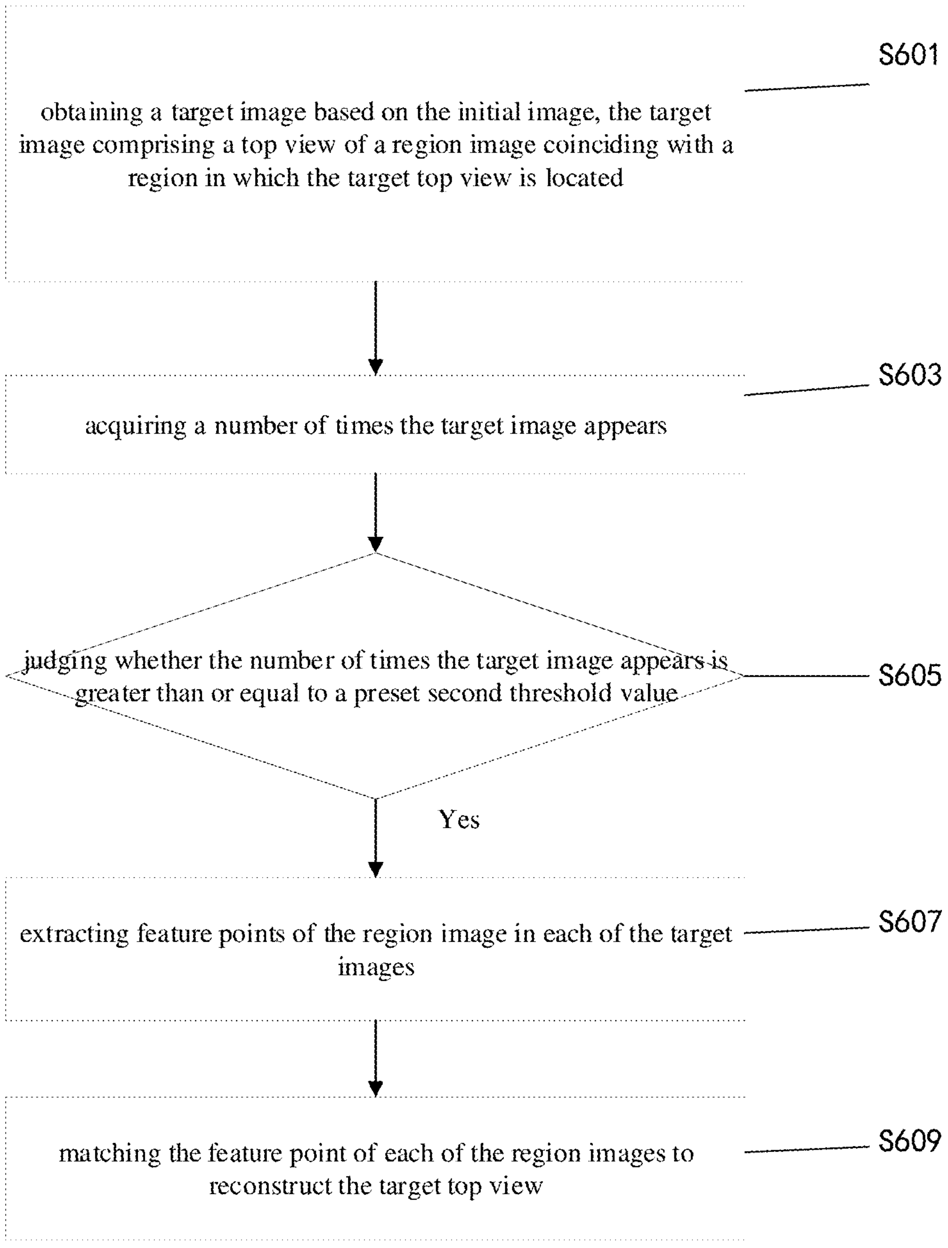
FIG. 6 is a schematic flow diagram of an alternative top view of an acquisition target according to an embodiment of the present disclosure.

In an embodiment of the present disclosure, reference is made to FIG. 6, which is a schematic flow diagram another top view of an acquisition target according to an embodiment of the present disclosure. The details are as follows:

S601, obtaining a target image based on the initial image, the target image comprising a top view of a region image coinciding with a region in which the target top view is located.

In the embodiment of the present description, an overhead view image corresponding to several initial images can be obtained by a vehicle during driving, and the same region can comprise a plurality of overhead view images under different viewing angles of a forward looking camera during driving; the target image may be an overhead image covering the same object or the same region at the same time in a plurality of overhead images (specifically, a region image overlapping with the region where the target overhead image is located may be comprised).

Specifically, the region image of the target image coincides with the target plan view.

S603, acquiring a number of times the target image appears.

In the embodiments of the present specification, since the vehicle acquires a plurality of images for a certain region or a certain image during traveling, the target image may appear a plurality of times;

S605, judging whether the number of times the target image appears is greater than or equal to a preset second threshold value.

In the embodiments of the present description, the number of times a target image appears may be greater than or equal to a preset second threshold value; the preset second threshold value may be 50 times.

When the number of times a target image appears is less than a preset second threshold value, it can be considered that the target image is invalid; the use can be abandoned or reacquired until the number of times an overhead image appears exceeds a preset second threshold value;

S607, if so, extracting a feature point of the region image in each of the target images.

In the embodiments of the present description, a Gaussian algorithm can be used to extract feature points of a region image.

Specifically, a difference operator (DoG) can be obtained by first performing Gaussian blurring on a target image, and then subtracting different Gaussian blurring results.

Specifically, a specific algorithm for extracting feature points is as follows: $L(x,y,\sigma)=G(x,y,\sigma)\cdot I(x,y)$ $$G(x, y, \sigma) = \frac{1}{2\pi\sigma^2}e^{-(x^2+y^2)/2\sigma^2}$$

$$G(x, y, \sigma) = \frac{1}{2\pi\sigma^2}e^{-\frac{x^2+y^2}{2\sigma^2}} = L(x, y\cdot k\sigma) - L(x, y\cdot\sigma)$$

(x,y) representing spatial coordinates, I(x,y) representing a pixel value at (x,y);

$L(x,y,\sigma)$, representing a dimensional space definition of a two-dimensional image, $G(x,y,\sigma)$ representing a scale variable Gaussian function, $\sigma$ representing a smoothness parameter of an image $D(x,y,\sigma)$ representing a Gaussian difference scale space, k representing the scale factor.

With comparing the pixel of the DoG result of each layer with a neighbourhood pixel, if it is an extreme point, then it is a feature point to be found. However, since these extreme points are discrete, and some of these extreme points belong to singular points, it needs to be repositioned to determine the position of the feature point.

In an embodiment of the present description, the manner of relocating to determine the feature point position in a manner that may comprise that the DoG function is fitted with a curve, and the Taylor series expansion is used to find the exact position.

Specifically, the algorithm for obtaining the position of the feature point using the Taylor series is as follows:

$$f(x)\approx f(0)+f'(0)*x+f''(0)*x$$

Wherein x represents a position variable, f'(0) representing the value of the first derivative of f(x) at x=0, f''(0) representing the value of the second derivative of f(x) at x=0.

After determining the position, the size and direction information of the matching target can be obtained, and then the position of the real extreme point can be determined.

$$m(x, y) = \sqrt{[L(x+1, y) - L(x-1, y)]^2 - [L(x, y+1) - L(x, y-1)]^2}$$

$$\theta(x, y) = \arctan\frac{L(x, y+1) - L(x, y-1)}{L(x+1, y) - L(x-1, y)}$$

wherein m(x,y) represents the gradient value at (x,y), $\theta(x,y)$ represents the direction of the gradient at (x,y), and L represents a scale space value of the coordinate position of the key point.

Figure 7:
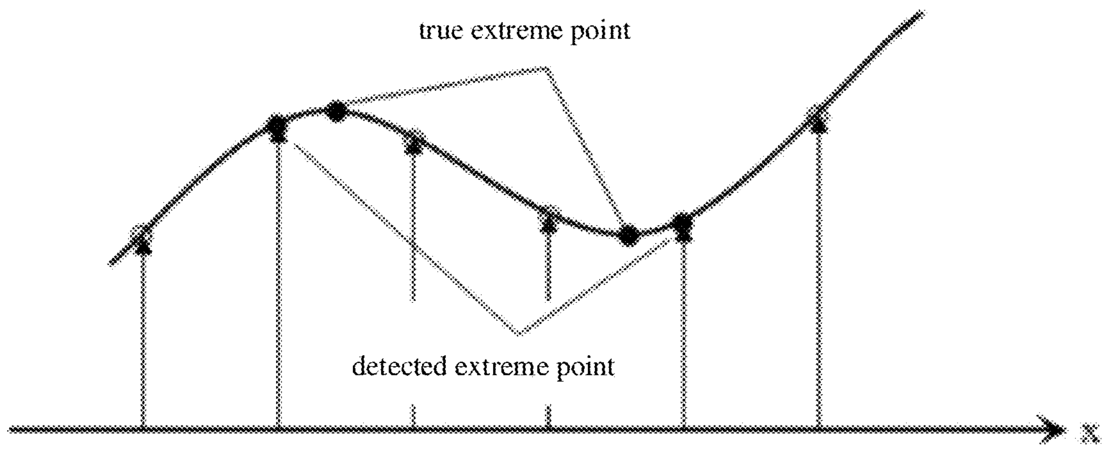
FIG. 7 is a schematic structural diagram for obtaining an extreme point position according to an embodiment of the present disclosure.

Specifically, with reference to FIG. 7, a structural diagram for obtaining the extreme point position is shown.

A true extreme point and a detected extreme point can be seen in the figure.

S609, matching the feature point of each of the region images to reconstruct the target top view.

In the embodiments of the present description, the feature points of each region image are matched according to the co-coordinate method of the image feature points, so as to obtain a new target top view; the target top view obtained in this way is more accurate in the present application.

S105, inputting the target top view into a preset deep learning model, and classifying pixel points of the target top view input into the preset deep learning model to obtain a partitioned image, the partitioned image comprising a travelable region image and a non-travelable region image.

The deep learning model preset in the present description may be a full convolution network model.

In the embodiments of the present description, a preset deep learning model, such as a full convolution network model, can receive an input of an image of an arbitrary size, and then an upsampling of the same size is input through deconvolution, namely, classifying each pixel.

In addition, after inputting a preset deep learning model into the target top view in the present application, the output result obtained is still an image; that is to say, the preset deep learning model only segments the input image to realize pixel-level classification and obtain a partitioned image.

Figure 8:
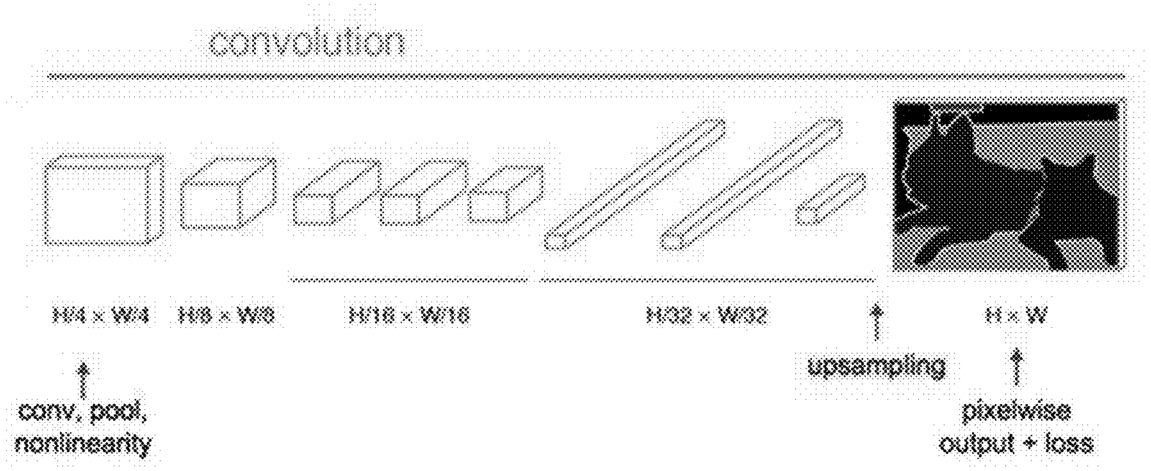
FIG. 8 is a schematic diagram of classifying pixels of an image according to an embodiment of the present disclosure.

Specifically, as shown in FIG. 8, a schematic diagram for classifying pixels of an image is shown.

Specifically: after inputting an image of size H×W (wherein H represents the height of the image and W represents the width of the image) into a preset deep learning model, performing operations such as cony, pool and non-linearity, the size of the result of the first layer may become $1/4^2$ of the input, the size of the result of the second layer may become $\frac{1}{8}^2$ of the input, . . . , the size of the result of the fifth layer may become $\frac{1}{16}^2$ of the input, . . . and the size of the result of the eighth layer may become $\frac{1}{32}^2$ of the input. With the number of times of cony and pooling increasing, the image size is mixed to be small, and the smallest layer is $\frac{1}{32}^2$ of the original image; at this moment, upsampling needs to be performed. to enlarge the result to the original image size and output an image (pixelwise output+loss), and the finally obtained image will classify the pixel points of each target top view according to the trained image;

In the embodiment of the present description, obtaining a partitioned image may include a travelable region image and a non-travelable region image, wherein the partitioned image may be an image after partitioning the target plan view, and the partitioned image may include a vehicle travelable region, for example: information such as a travelable road and a travelable intersection; the non-travelable region image may include information such as a parking space line and a parking space area.

S107, scanning the partitioned image to identify a travelable region of the vehicle.

In the present embodiment, each region information in the divided image is scanned to determine a travelable region of the vehicle; specifically, the travelable region includes a travelable road and a travelable intersection.

Specifically, a straight lane trend recognition module may be used to recognize a travelable road in a travelable region, and an intersection trend recognition module may be used to recognize a travelable intersection in the travelable region.

In the present specification embodiment, before the travelable road and the travelable intersection in the travelable region are identified, the method further comprises the steps of:

- scanning the partitioned image using a grid with a preset size to obtain the travelable region and a scanned region of the vehicle;
- adjusting the travelable region based on the scanned region, and reconstructing the travelable region;

In one embodiment of the present disclosure, adjusting the travelable region based on the scanned region, and reconstructing the travelable region comprises:

- performing an inflation operation on the travelable region based on the scanned region to obtain an inflation region;
- performing a corrosion operation on the inflation region based on the scanned region, and reconstructing the travelable region;

In the embodiments of the present description, specifically, when designing, the size of the grid can be selected according to actual situations, and in the present application, an operation of first expanding and then eroding is used on the image, so that the situation where the pixels are missing or are not connected to the main body in the recognition result can be effectively removed; making the available travelable region more accurate;

S109, generating a path trajectory corresponding to the vehicle travel state information based on the travelable region, the path trajectory being one of the preset driving paths.

In the present specification, the preset driving path includes at least one travelable path, and in particular, may include a plurality of travelable paths; the generated path trajectory may be one of a plurality of travelable paths.

Figure 9:
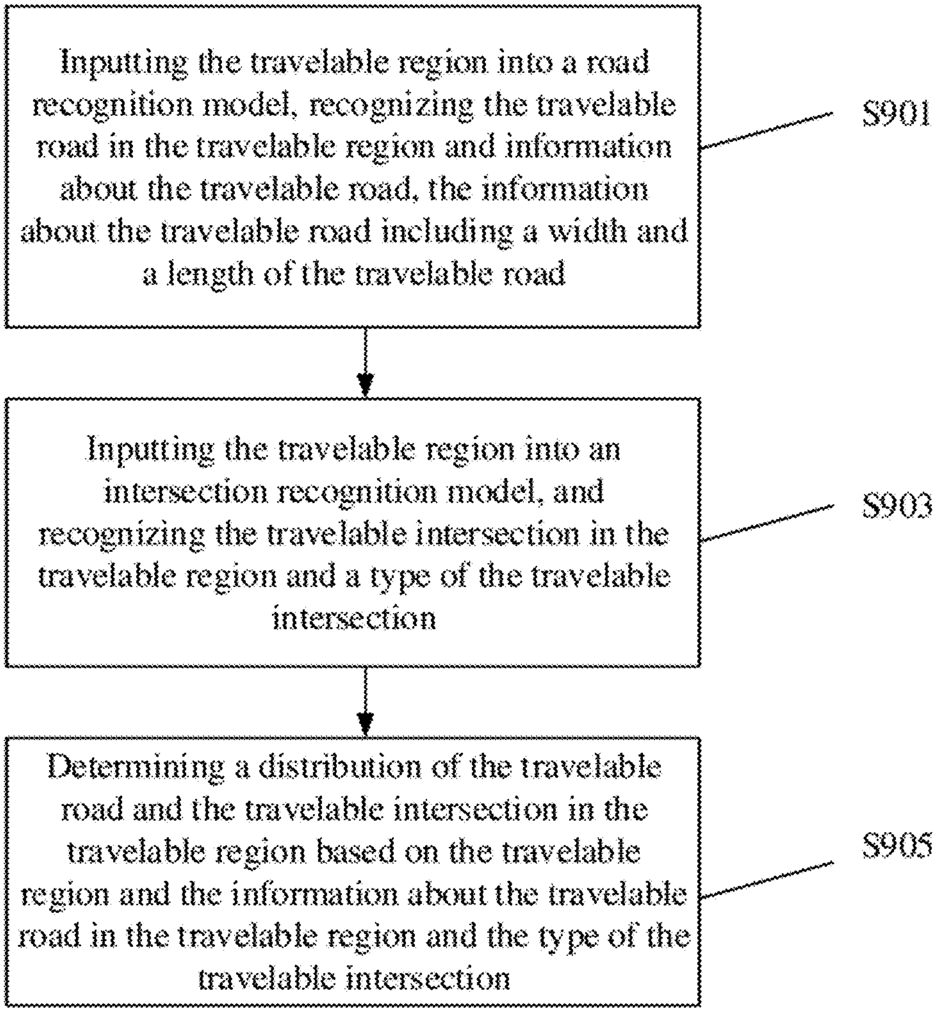
FIG. 9 is a schematic flow diagram illustrating a method for recognizing a travelable road and a travelable intersection in a travelable region according to an embodiment of the present disclosure.

In the present embodiment, the generating the path trajectory corresponding to the vehicle travel state information based on the travelable region may comprise the steps of:

Step 1, determining the travelable road, the travelable intersection, and a distribution of the travelable road and the travelable intersection in the travelable region based on the travelable region;

In the embodiment of the present specification, FIG. 9 is a schematic flow diagram illustrating a method for recognizing a travelable road and a travelable intersection in a travelable region according to an embodiment of the present disclosure; specifically:

S901, inputting the travelable region into a road recognition model, recognizing the travelable road in the travelable region and information about the travelable road, the information about the travelable road including a width and a length of the travelable road.

In an embodiment of the present description, the road recognition model may be a road recognition algorithm that recognizes a road path on a road and gives position information of a road marking.

Specifically, in the present application, an algorithm for recognizing a straight road trend of a road can be used to recognize information such as a travelable straight road in a travelable area.

Specifically, in this specification embodiment, a specific method of recognizing a travelable road in a travelable region may include the steps of:

- performing longitudinal projection on a road recognition result with the size of m*n to obtain the number of road pixels in each column of pixels $h_i$;

$$h_i=h(i), i=0,1,2, \ldots, n$$

- wherein m represents the height of the image and n represents the width of the image; and
- $h_i$ represents the number of road pixels in the ith column of pixels.

The range of values of $h_i$ is [0,m], then statistics is performed on the value h of $h_i$, the range of values of h is [0,m], and the number of times $w_h$ different values of h occur is:

$$w_h=w(h)$$

- wherein $w_h$ represents the number of times different values of h occur.

The value range of $w_h$ is [0,n], and when $w_h$ is taken as the maximum value, the size of h is recorded as $h_{max}$ at this time is, i.e. the threshold value satisfying that “column” becomes a road is found; and $$h_i=h(i)>h_{max}$$

The maximum value $i_{max}$ and the minimum value $i_{min}$ of i are determined, namely, the column positions of both sides of the road in the image, namely, the road width.

S903, inputting the travelable region into an intersection recognition model, and recognizing the travelable intersection in the travelable region and a type of the travelable intersection.

In the embodiment of the present specification, the intersection recognition model may be an algorithm for recognizing an intersection on a road, and specifically, may recognize information such as whether or not an intersection on a travelable road is present and what kind of intersection.

Specifically, in the embodiment of the present description, when a travelable intersection in a travelable region is identified, based on the identified travelable road, not every intersection needs to be turned while the vehicle is traveling, and when the vehicle travels to an intersection where turning is not needed, the recognition is performed in a straight road mode; if the vehicle needs to turn, it is indicated as a travelable intersection.

S905, determining a distribution of the travelable road and the travelable intersection in the travelable region based on the travelable region and the information about the travelable road in the travelable region and the type of the travelable intersection.

In the present embodiment, based on the above-described recognition method of the travelable road and the travelable intersection, it is possible to accurately determine the distribution of the travelable road and the travelable intersection in the travelable region.

In another embodiment of the present specification, the travelable intersection and the travelable road in the travelable region may also be determined by the driving range and the heading angle of the vehicle.

Specifically, a method of recognizing a travelable intersection and a travelable road in a travelable region includes the steps of:

acquiring a vehicle speed and a steering wheel angle of the vehicle in real time;

In the present embodiment, the vehicle speed and the steering wheel angle of the vehicle can be obtained from the CAN signal;

determining a driving range and a heading angle of the vehicle based on the vehicle speed and the steering wheel angle of the vehicle;

In the present embodiment, the running time of the vehicle can also be acquired, and specifically, the driving range of the vehicle can be calculated from the vehicle speed and the miming time of the vehicle; the heading angle of the vehicle can be calculated from the steering wheel angle of the vehicle.

determining a travelable intersection and a travelable road in a travelable region based on a driving range of the vehicle and the heading angle;

In the embodiment of the present description, the fifth column or the (n−6)th column of pixels is selected according to the left turn or the right turn when the vehicle travels to the intersection region according to the driving range of the vehicle:

$$p_i=p(i), i=0,1,2, \ldots, m$$

When p(i) is 0 or 1, it represents whether it is a road, and determines the width of the road;

$$P_i=p_i-p_{i-1}, i=1,2, \ldots, m$$

Wherein $p_i$ represents whether the ith row in the fifth column or the (n−6)th column is a road pixel.

p(i) is 0 or 1, that is, whether it is a road.

$P_i$ represents the relationship between the ith row and the (i−1)th row.

When $P_i>=0$, it is indicated that the pixel road is continuous (namely, being a travelable road), and when $P_i=-1$, it represents that the pixel road is discontinuous, and the number of times of continuous occurrence of $P_i=-1$ is $t_1$. When $t_1<T_{-1}$, the discontinuity is ignored (wherein $T_{-1}$ is the pixel discontinuity threshold value). According to continuous processing, $P_i$ is set to zero, the number of times of continuous occurrence of $P_i=0$ is $t_0$, and when $t_0>T_0$ (wherein $T_0$ is the intersection width threshold value), an intersection appears in the frame of image. The number of frames in which the intersection is continuously detected is t, and when $t>T_{frame}$ (wherein $T_{frame}$ represents a threshold value for the number of frames in which the intersection is continuously detected), it is determined that the intersection is present, the direction $\theta_s$ of the vehicle at that time is recorded, and turning is started, and the change in the vehicle deflection angle $\Delta\theta$ is:

$$\Delta\theta=\mathrm{abs}(\theta_s-\theta(t))$$

wherein θ(t) represents the deflection angle of the vehicle at time t, and abs represents taking an absolute value function.

When $\Delta\theta>0.8*\theta_i$, the vehicle has completed turning and enters the straight lane trend recognition module, while $\theta_i$ is the size of the intersection rotation angle recorded during self-learning.

Figure 10:
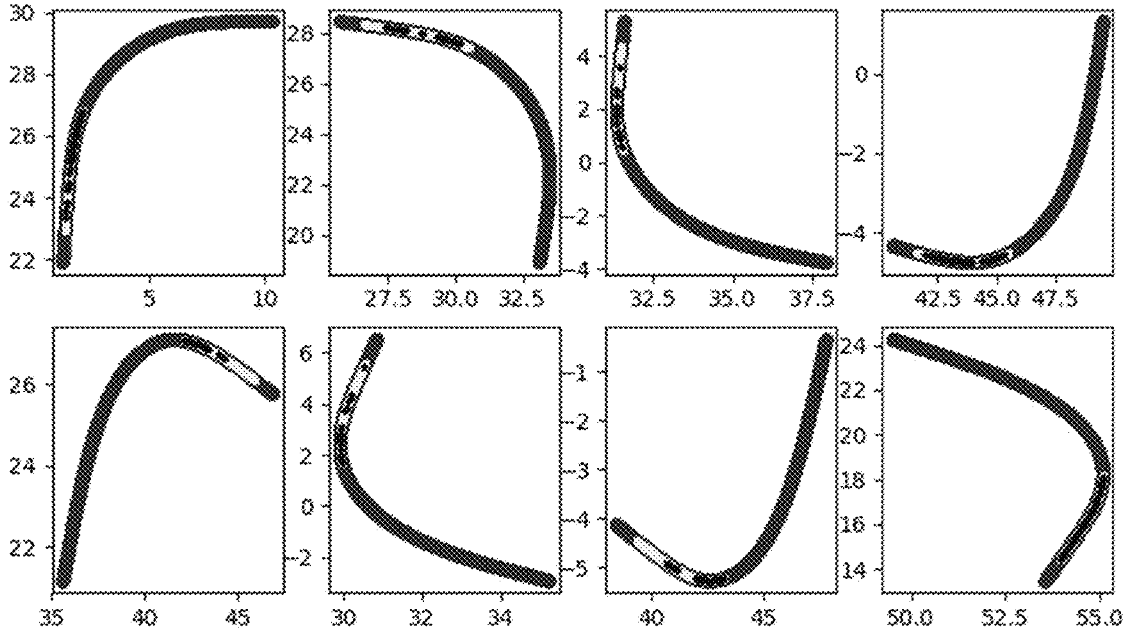
FIG. 10 is a diagram showing recognition results of a travelable road and a travelable intersection of a travelable region according to an embodiment of the present disclosure.

A travelable road and a travelable intersection in a travelable region can also be identified based on the above-mentioned method, and a concrete schematic diagram is shown in FIG. 10.

Step 2, generating a path trajectory corresponding to the vehicle travel state information based on the distribution of the travelable road and the travelable intersection.

In the present specification embodiment, the travel path of the vehicle may be determined based on the distribution of the travelable road and the travelable intersection in the travelable region.

A path trajectory corresponding to the vehicle travel state information is generated based on a travel path of the vehicle and the vehicle travel state information; with this method, the present application can accurately obtain a path trajectory corresponding to the vehicle travel state information.

In the present embodiment, the generating the path trajectory corresponding to the vehicle travel state information based on the travelable region may further include:

constructing a map corresponding to the preset driving path based on the path trajectory.

In this description embodiment, the map may be an underground garage map; specifically, according to the generated path trajectory, the path trajectory can be processed by the trajectory abstraction algorithm, and then the underground garage map can be constructed; the underground garage map constructed based on the method is an abstract path map; in the present application, the map can be applied to any scene, and underground garage automatic driving without field-side equipment; the underground garage map is a path planning map that conforms to driver's driving habits.

In a specific embodiment of the present description, the following method may be used to process the path trajectory: specifically included are:

Roads are often composed of five types: a starting point, a straight road, an intersection, a dead road and an end point, wherein the intersection is divided into a cross intersection and a T-shaped intersection. When the vehicle travels to the intersection, a turning decision needs to be made to determine the forward path of the vehicle, and the current travel direction is default as the reference direction. An intersection structure is defined, comprising four parameters: the intersection number Node, the mileage Dist, the intersection turning information Turn INF and the turning angle Angle, wherein the mileage Dist is the distance between the location and the starting point. In addition, a travel flag Pass Flag is set separately, in which "0" represents continued travel and "1" represents a dead road, and forward travel is prohibited.

The following table shows the driving situation in one embodiment:

| intersection diagram | exploratory trajectory | entry condition | entry exploration parameter setting | dead return parameter setting | the characteristics of the dead return meeting the intersection |
|---|---|---|---|---|---|
|  crossroad | ① | crossroad Pass_Flag = 0 | Pass_Flag = 0; Turn_INF = 1; Node = Node + 1 | Pass_Flag = 1 remaining parameters unchanged | return time crossroad |
| | ② | crossroad Pass_Flag = 1; Turn_INF = 1 | Pass_Flag = 0; Turn_INF = 2; Node = Node | | |
| | ③ | crossroad Pass_Flag = 1; Turn_INF = 2 | Pass_Flag = 0; Turn_INF = 3; Node = Node | | |
| | ④ | crossroad Pass_Flag = 1; Turn_INF = 3 | Pass_Flag = 1; Node = Node − 1 calling parameters of the previous intersection | determined by the parameters of the previous intersection | |

The table above shows an intersection where the angle Angle defaults to 90 degrees left. When entering from the direction ①, pass Flag=0 represents that the advancing can be continued. After entering, turn INF is set to 1, and the intersection number Node is updated to the previous intersection number plus 1, and since the left turns to a dead road, the Pass Flag at this point is set to 1. When entering from the direction ②, the Pass Flag is set to 1, the Turn INF is set to 2, because it is the same intersection, the Node is unchanged, and since the left turns to a dead road, the Pass Flag is set to 1 again. When entering from the direction ③, it is the same as entering from direction ③. When entering from the direction ④, the intersection is a dead road, returning to the intersection and returning to the previous intersection are performed, and finally Pass Flag=1, and the intersection number Node being the previous intersection number.

In one embodiment of the present disclosure, after the generating a path trajectory corresponding to the vehicle travel state information based on the travelable region, the method further comprises: when the vehicle is traveling on the preset driving path again, it comprises the following steps:

acquiring vehicle travel state information and an initial image of a surrounding environment of a preset driving path corresponding to the vehicle travel state information in real time;

In the embodiments of the present description, the specific acquisition method is the same as that described above.

calculating a target top view corresponding to the initial image via a nonlinear difference correction algorithm according to the initial image;

inputting the target top view into a preset deep learning model, and classifying pixel points of the target top view input into the preset deep learning model to obtain a partitioned image, the partitioned image comprising a travelable region image and a non-travelable region image;

scanning the partitioned image to recognize a travelable region of the vehicle;

generating a current path trajectory corresponding to the vehicle travel state information based on the travelable region, the path trajectory being one of the preset driving;

In the present embodiment, when the driver drives the vehicle to travel on the preset driving path, the path trajectory obtained each time is not the same.

Specifically, when the vehicle travels on the preset driving path again, the current path trajectory corresponding to the vehicle travel state information can be obtained using the same method for obtaining a path trajectory.

In the present embodiment, the generating the current path trajectory corresponding to the vehicle travel state information based on the travelable region further includes:

performing multi-trajectory fusion on the current path trajectory and the path trajectory obtained the last time, and reconstructing a map corresponding to the preset driving.

In the embodiments of the present description, the current path trajectory and the spatial position of the same point in the path trajectory obtained in the last time are matched so as to perform information fusion; A new path trajectory is obtained, and this method is used to check the path trajectory to ensure that a more accurate abstract map, such as a lower garage map, is obtained.

Preferably, in the present specification embodiment, the preset driving path may be repeatedly traveled; at least three path trajectories are obtained.

Multi-trajectory fusion is performed between each acquired current path trajectory and a path trajectory obtained in the last time or a new path trajectory to obtain a more accurate map.

In a specific embodiment of the present description, a least squares solution can be used to achieve multi-track fusion; the details are as follows:

For example, the travel trajectory learned for the first time serves as the reference point set X, and the travel trajectory learned for the second time serves as the point set P to be fused. The reference point set X and the point set to be fused P are respectively:

$$X=\{x_1,x_2, \ldots ,x_n\}$$

$$P=\{p_1,p_2, \ldots ,p_n\}.$$

The point set P is rotated and translated to obtain the objective error function:

$$E(R, t) = \frac{1}{N_p}\sum_{i=1}^{N_p}\|x_i - Rp_i - t\|^2,$$

E(R,t) representing an error function, R representing a rotation matrix, t representing the translation matrix and $N_p$ representing the number of elements in the point set P.

Specifically, the centroids of the reference point set X and the point set P to be fused are:

$$\mu_x = \frac{1}{N_x}\sum_{i=1}^{N_x} x_i$$

$$\mu_p = \frac{1}{N_p}\sum_{i=1}^{N_p} p_i,$$

where $\mu_x$ denotes the centroid of reference point set X, $N_x$ is the number of elements in reference point set X, $\mu_p$ denotes the centroid of the point set P to be fused, and $N_p$ represents the number of elements in the point set P to be fused.

Therefore:

$$X' = \{x_i - \mu_x\} = \{x_1 - \mu_x, x_2 - \mu_x, \ldots, x_n - \mu_x\} = \{x'_i\}$$

$$P' = \{p_i - \mu_p\} = \{p_1 - \mu_p, p_2 - \mu_p, \ldots, p_n - \mu_p\} = \{p'_i\},$$

Wherein X' represents a set composed of deviations of each element in the reference point set X from the centre of mass, and P' represents the set of deviations in the point set P to be fused from the centroid of each element.

The optimal transformation is solved using singular value decomposition (SVD) decomposition:

$$W = \sum_{i=1}^{N_x} x_i' p_i'^T = U\begin{bmatrix}\sigma_1 & 0 & 0\\ 0 & \sigma_2 & 0\\ 0 & 0 & \sigma_3\end{bmatrix}V^T$$

where W represents the real number matrix to be decomposed and $$p_i'^T$$

represents the transpose of $$p_i',$$

U and V are a unitary orthogonal matrices, which are respectively called a left singular matrix and right singular matrix, and $V^T$ represents the transpose of V, $\sigma_1$, $\sigma_2$, $\sigma_3$ being singular values.

When rank (W)=3, the optimal solution of E(R,t) is unique and it is solvable to obtain a value of U, V.

Therefore, the rotation matrix R and the translation matrix t are respectively:

$$R = UV^T$$

$$t = \mu_x - R\mu_P$$

Figure 11:
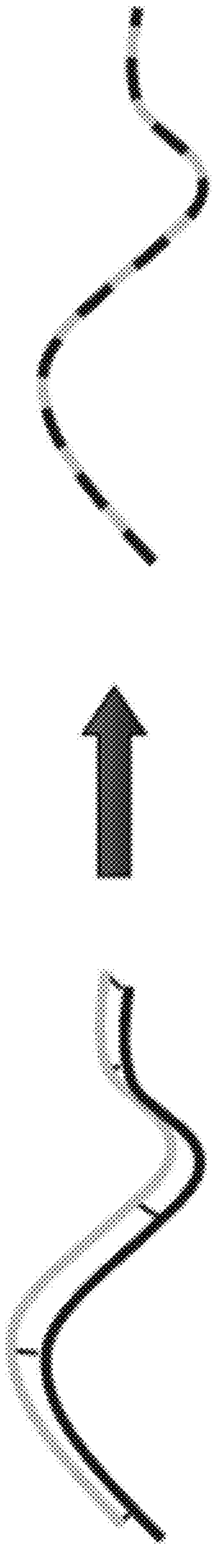
FIG. 11 is an effect diagram of path trajectory fusion according to an embodiment of the present disclosure.

The rotation matrix R and the translation matrix t are introduced into the above-mentioned target error function E(R,t), and when the obtained target error function E(R,t) is sufficiently convergent, the fusion effect of the two point sets is as shown in FIG. 11 below.

In an embodiment of the present description, before performing multi-trajectory fusion on the current path trajectory and the previously obtained path trajectory and reconstructing the underground garage map, it further comprises:

H1, judging whether the coincidence degree between the current path trajectory and the path trajectory obtained the last time is greater than or equal to a preset first threshold value;

In the embodiment of the present description, the preset first threshold value may be 95%;

H2, if the coincidence degree between the current path trajectory and the path trajectory obtained the last time is greater than or equal to the preset first threshold value, fusing the current path trajectory and the path trajectory obtained the last time.

In the embodiment of the present description, if the coincidence degree between the current path trajectory and the path trajectory obtained the last time is greater than or equal to the preset first threshold value, the current path trajectory and the path trajectory obtained the last time can be fused.

H3, if the coincidence degree between the current path trajectory and the path trajectory obtained the last time is less than a preset first threshold value, determining whether a matching degree between the current path trajectory and the preset driving path is less than a matching degree between the path trajectory obtained the last time and the preset driving path;

In the embodiments of the present description, if the degree of coincidence between the current path trajectory and the path trajectory obtained in the last time is less than a preset first threshold value, one path trajectory with a smaller number of target top views obtained in the generation process of the current path trajectory and the path trajectory obtained in the last time may be selected to be discarded.

Specifically, the matching degree between the current path trajectory and the preset driving path can be used to judge the current path trajectory and a path trajectory with a smaller number of target plan views obtained in the generation process of the path trajectory obtained in the last time.

H4, if so, regenerating the current path trajectory.

Specifically, in the embodiment of the present description, if the matching degree between the current path trajectory and the preset driving path is less than the matching degree between the path trajectory and the preset driving path obtained in the last time, the current path trajectory is given up, and the vehicle travels on the preset driving path again so as to obtain a new current path trajectory again, so as to subsequently adopt the new current path trajectory to perform multi-trajectory fusion with the path trajectory obtained in the last time, and reconstruct a path trajectory.

Specifically, the map corresponding to the preset driving path can also be reconstructed subsequently according to the reconstructed path trajectory.

In another embodiment of the present description, if the matching degree between the current path trajectory and the preset driving path is greater than the matching degree between the path trajectory and the preset driving path obtained in the last time, the path trajectory obtained in the last time is given up, and the vehicle travels on the preset driving path again so as to obtain a new current path trajectory again, so as to subsequently adopt the new current path trajectory to perform multi-trajectory fusion with the current path trajectory obtained in the last time, and reconstruct a path trajectory.

Specifically, the map corresponding to the preset driving path can also be reconstructed subsequently according to the reconstructed path trajectory.

The path trajectory obtained by using the above-mentioned method in the present application is closer to the actual driving trajectory; not only can the ride comfort of the vehicle control in automatic driving be improved, but also the risk of the vehicle deviating from a predetermined trajectory can be reduced.

It can be seen from the above-mentioned embodiments of the path construction method, device, terminal and storage medium provided in the present disclosure that when the preset driving path is driven, the embodiments of the present disclosure acquire vehicle driving state information and an initial image of the surrounding environment of the preset driving path corresponding to the vehicle driving state information in real time; according to the initial image, obtaining a target top view corresponding to the initial image by calculating via a non-linear difference correction algorithm; inputting the target top view into a preset deep learning model, and classifying pixel points of the target top view input with the preset deep learning model to obtain a partitioned image, wherein the partitioned image comprises a travelable region image and a non-travelable region image; scanning the partitioned image to recognize a travelable region of the vehicle; generating a path trajectory corresponding to the vehicle travel state information based on the travelable region, the path trajectory being one of the preset driving paths; with the technical solution provided by the embodiments of the present description, during a vehicle traveling through a preset driving path, a path trajectory is automatically learned to facilitate a subsequent vehicle automatically planning a path during automatic driving.

Figure 12:
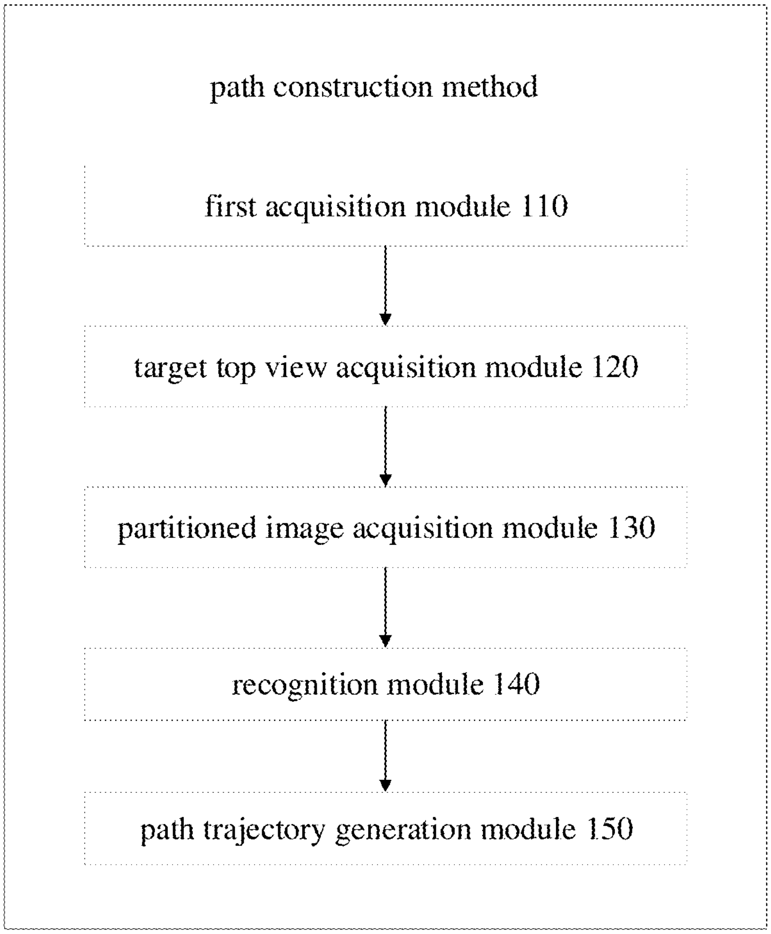
FIG. 12 is a schematic structural diagram of a path construction device according to an embodiment of the present disclosure.

An embodiment of the present disclosure also provides a path construction device, as shown in FIG. 12, which shows a schematic structural diagram of a path construction device provided by an embodiment of the present disclosure; specifically, the device comprises:

- a first acquisition module 110 for acquiring vehicle travel state information and an initial image of a surrounding environment of a preset driving path corresponding to the vehicle travel state information in real time when the vehicle is traveling on the preset driving path;
- a target top view acquisition module 120 for calculating a target top view corresponding to the initial image via a nonlinear difference correction algorithm according to the initial image;

A partitioned image acquisition module 130 for inputting the target top view into a preset deep learning model, and classifying pixel points of the target top view input with the preset deep learning model to obtain a partitioned image, wherein the partitioned image comprises a travelable region image and a non-travelable region image;

- a recognition module 140 for scanning the partitioned image to recognize a travelable region of the vehicle;
- a path trajectory generation module 150 for generating a path trajectory corresponding to the vehicle travel state information based on the travelable region, the path trajectory being one of the preset driving paths.

In the present specification embodiment, a map constructing module for constructing a map corresponding to the preset driving path based on the path trajectory is further included.

In an embodiment of the present description, the first acquisition module 110 comprises:

- a first acquisition unit configured for acquiring the vehicle travel state information when the vehicle is traveling on the preset driving path in real time, the vehicle travel state information including a travel strategy when the vehicle is traveling on the preset driving path and a driving habit of a driver;
- a second acquisition unit configured for acquiring the initial image of the surrounding environment of the preset driving path when the vehicle is traveling on the preset driving path in real time according to the travel strategy and the driving habit of the driver.

In an embodiment of the present description, the first acquisition unit comprises:

- a first acquisition subunit for acquiring a vehicle speed and a steering wheel angle of the vehicle in real time;
- a first determination subunit for determining a driving range and a heading angle of the vehicle based on the vehicle speed and the steering wheel angle of the vehicle;
- a second determination subunit for determining the travel strategy of the vehicle from the driving range and the heading angle of the vehicle, the travel strategy of the vehicle including the driving range on the travelable road and whether to turn at the travelable intersection.

In an embodiment of the present description, the first acquisition unit further comprises:

- a second acquisition subunit for acquiring operation data when the vehicle is traveling on the preset driving path in real time;
- a third acquisition subunit for pre-processing the operation data of the vehicle to obtain target operation data;
- a feature extraction subunit for inputting the target operation data into a cyclic neural network, and extracting features of the target operation data from the cyclic neural network;
- a driving habit determining subunit for inputting the features into a full connection network, and predicting a driving habit of a driver when the vehicle is traveling on the preset driving path; the driving habit including a traveling speed on a travelable road and a steering angle at a travelable intersection.

In an embodiment of the present specification, the device further comprises:

- a second acquisition module for again acquiring vehicle travel state information and an initial image of a surrounding environment of a preset driving path corresponding to the vehicle travel state information in real time when the vehicle is traveling on the preset driving path;
- a target top view acquisition module for calculating a target top view corresponding to the initial image via a nonlinear difference correction algorithm according to the initial image;
- a partitioned image acquisition module for inputting the target top view into a preset deep learning model, and classifying pixel points of the target top view input into the preset deep learning model to obtain a partitioned image, the partitioned image comprising a travelable region image and a non-travelable region image;
- a recognition module for scanning the partitioned image to recognize a travelable region of the vehicle;
- a current path trajectory generation module for generating a current path trajectory corresponding to the vehicle travel state information based on the travelable region, the path trajectory being one of the preset driving paths;

In an embodiment of the present specification, further comprising: a map reconstruction module for performing multi-trajectory fusion on the current path track and the path track obtained in the last time, and reconstructing the underground garage map.

In an embodiment of the present specification, the device further comprises:

a coincidence degree judgement module for judging whether the coincidence degree between the current path trajectory and the path trajectory obtained the last time is greater than or equal to a preset first threshold value;

a trajectory fusion module for, if the coincidence degree between the current path trajectory and the path trajectory obtained the last time is greater than or equal to the preset first threshold value, fusing the current path trajectory and the path trajectory obtained the last time.

In an embodiment of the present specification, the device further comprises:

a matching degree determination module for, if the coincidence degree between the current path trajectory and the path trajectory obtained the last time is less than a preset first threshold value, determining whether a matching degree between the current path trajectory and the preset driving path is less than a matching degree between the path trajectory obtained the last time and the preset driving path;

a current path trajectory reconstruction module for regenerating the current path trajectory if the matching degree between the current path trajectory and the preset driving path is less than the matching degree between the path trajectory and the preset driving path obtained in the previous time.

In the present embodiment, the object overhead view acquisition module 120 includes:

a target image acquisition unit for obtaining a target image based on the initial image, the target image comprising a top view of a region image coinciding with a region in which the target top view is located;

a number of times acquisition unit for acquiring a number of times the target image appears;

a judgement unit for judging whether the number of times the target image appears is greater than or equal to a preset second threshold value;

a feature point extraction unit for, if so, extracting a feature point of the region image in each of the target images;

a feature point matching unit for matching the feature points of each of the region images to reconstruct the target top view.

In the present embodiment, the object overhead view acquisition module 120 further includes:

a corresponding relationship acquisition unit for acquiring a corresponding relationship between a top view of the initial image and the initial image based on the non-linear difference correction algorithm, the corresponding relationship comprising corresponding coordinate points between the top view of the initial image and the initial image;

a target coordinate point acquisition unit for acquiring a target coordinate point from the initial image based on the corresponding relationship;

a target top view construction unit for constructing a target top view corresponding to the initial image based on the target coordinate point.

In an embodiment of the present description, the path trajectory generation module 150 comprises:

a first determination unit for determining the travelable road, the travelable intersection, and a distribution of the travelable road and the travelable intersection in the travelable region based on the travelable region;

a path trajectory generation unit for generating a path trajectory corresponding to the vehicle travel state information based on the distribution of the travelable road and the travelable intersection.

In an embodiment of the present specification, the device further comprises:

a scanning unit for scanning the partitioned image using a grid with a preset size to obtain the travelable region and a scanned region of the vehicle;

an adjusting unit for adjusting the travelable region based on the scanned region, and reconstructing the travelable region;

In an embodiment of the present description, the adjusting unit comprises:

a first adjusting subunit for performing an inflation operation on the travelable region based on the scanned region to obtain an inflation region;

a second adjusting subunit for performing a corrosion operation on the inflation region based on the scanned region, and reconstructing the travelable region;

In an embodiment of the present description, the first determination unit includes:

a first recognition subunit for inputting the travelable region into a road recognition model, recognizing the travelable road in the travelable region and information about the travelable road, the information about the travelable road including a width and a length of the travelable road.

a second recognition subunit for inputting the travelable region into an intersection recognition model, and recognizing the travelable intersection in the travelable region and a type of the travelable intersection;

a third determination subunit for determining a distribution of the travelable road and the travelable intersection in the travelable region based on the travelable region and the information about the travelable road in the travelable region and the type of the travelable intersection.

The embodiment of present disclosure further provides a path construction terminal, wherein the terminal comprises a processor and a memory, the memory having stored therein at least one instruction or at least one piece of program, the at least one instruction or the at least one piece of program being loaded and executed by the processor to implement the path construction method as described in the method embodiment.

The memory may be used to store software programs and modules, and the processor may execute various functional applications and data processing by executing the software programs and modules stored in the memory. The memory can mainly comprise a program storage region and a data storage area, wherein the program storage region can store an operating system, an application program required for a function, etc.; the storage data region may store data created according to the use of the device, etc. In addition, the memory may include high speed random access memory and may also include non-volatile memory, such as at least one magnetic disk storage device, flash memory device, or other volatile solid state storage device. Accordingly, the memory may also include a memory controller to provide access to the memory by the processor.

Figure 13:
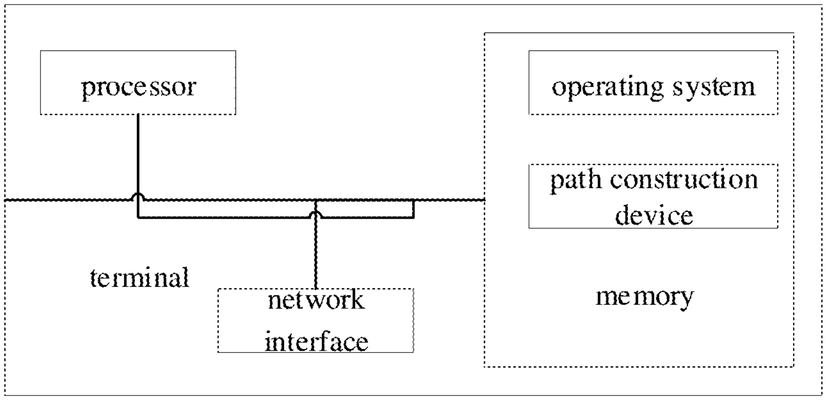
FIG. 13 is a schematic structural diagram of a path construction terminal according to an embodiment of the present disclosure.

FIG. 13 is a schematic structural diagram of a path construction terminal provided by an embodiment of the present disclosure, and the internal structure of the path construction terminal may include, but is not limited to: a processor, a network interface and a memory, wherein the processor, the network interface and the memory in the path construction terminal can be connected via a bus or other means, and the connection via a bus is taken as an example in FIG. 13 shown in the embodiment of the present description.

The processor (or CPU (Central Processing Unit)) is the computing core and the control core of the path construction terminal. The network interface may optionally include a standard wired interface, a wireless interface (e.g. WI-FI, mobile communication interface, etc.). A memory is a memory device in the path construction terminal for storing programs and data. It will be appreciated that the volatile memory here may be a high-speed RAM storage non or may be a non-volatile storage device (e.g. at least one disk storage device); optionally, there may be at least one storage device located remotely from the aforementioned processor. The memory provides a storage space, and the storage space stores an operating system of the path construction terminal, which may include but is not limited to: a Windows system (an operating system), a Linux (an operating system), etc. and the present disclosure is not limited thereto; also stored in the memory space are one or more instructions adapted to be loaded and executed by a processor, which instructions may be one or more computer programs, including program code. In an embodiment of the present description, a processor loads and executes one or more instructions stored in memory to implement the path construction method provided by the embodiment of the method described above.

Embodiments of the present disclosure also provide a computer-readable storage medium arrangeable in a path construction terminal to hold at least one instruction, at least one piece of program, a set of codes or a set of instructions for implementing the path construction method according to an embodiment of the method, the at least one instruction, the at least one piece of program, the set of codes or the set of instructions being loadable and executable by a processor of an electronic device to implement the path construction method according to the embodiment of the method.

Alternatively, in the present embodiment, the above-mentioned storage medium may include, but is not limited to: various media may store the program code, such as a U-disk, a ROM (Read-Only Memory), a RAM (Random Access Memory), a removable hard disk, a magnetic or optical disk.

Be noted that the foregoing sequence of the embodiments of the present disclosure has been presented for purposes of illustration only and is not intended to represent the advantages or disadvantages of the embodiments. In addition, specific embodiments of the present specification have been described above. Other embodiments are within the scope of the following claims. In some cases, the acts or steps recited in the claims may be executed out of the order in the embodiments and still achieve desirable results. Additionally, the processes depicted in the figures do not necessarily require the particular order shown, or sequential order, to achieve desired results. Multi-tasking and parallel processing are also possible or may be advantageous in some embodiments.

Each embodiment described in this specification is presented in an enabling manner, wherein like reference numerals refer to like elements throughout, and wherein each embodiment differs from the others in that it is emphasized that the same is true. In particular, for the device and server embodiments, which are substantially similar to the method embodiments, the description is relatively simple, with reference to the partial description of the method embodiments.

Those of ordinary skill in the art will appreciate that all or a portion of the steps for implementing the embodiments described above may be performed by hardware or by a program that instructs the associated hardware. The program may be stored on a computer-readable storage medium, such as a read-only memory, magnetic or optical disk.

What has been disclosed is merely a preferred embodiment of the disclosure, and it is not intended to limit the scope of the disclosure to the particular embodiments disclosed, but on the contrary, the intention is to cover all modifications and equivalent arrangements included within the spirit and scope of the disclosure as defined by the appended claims.

The invention claimed is:

1. A path construction method, applied to an automatic driving vehicle, comprising:

when the vehicle is traveling on a driving path of an underground garage at a first time, acquiring a first vehicle travel state information and a first initial image of a surrounding environment of the driving path corresponding to the first vehicle travel state information in real time, the underground garage includes a plurality of travelable paths, the driving path is one of the travelable paths, wherein the first vehicle travel state information comprises a travel strategy when the vehicle is traveling on the driving path and a driving habit of a driver;

calculating a first target top view corresponding to the first initial image via a nonlinear difference correction algorithm according to the first initial image;

inputting the first target top view into a preset deep learning model, and classifying pixel points of the first target top view input into the preset deep learning model to obtain a first partitioned image, the first partitioned image comprising a first travelable region image of a travelable region and a first non-travelable region image of a non-travelable region, a travelable region includes a travelable road and a travelable intersection, a non-travelable region includes a parking space line and a parking space area;

scanning the first partitioned image to recognize a first travelable region of the vehicle; and generating a first path trajectory corresponding to the first vehicle travel state information based on the first travelable region; and further comprises:

when the vehicle is traveling on the driving path at a second time, acquiring a second vehicle travel state information and a second initial image of a surrounding environment of the driving path corresponding to the second vehicle travel state information in real time;

calculating a second target top view corresponding to the second initial image via the nonlinear difference correction algorithm according to the second initial image;

inputting the second target top view into the preset deep learning model, and classifying pixel points of the second target top view input into the preset deep learning model to obtain a second partitioned image, the second partitioned image comprising a second travelable region image of the travelable region and a second non-travelable region image of the non-travelable region;

scanning the second partitioned image to recognize a second travelable region of the vehicle; and generating a second path trajectory corresponding to the second vehicle travel state information based on the second travelable region; and performing multi-trajectory fusion on the second path trajectory and the first path trajectory, and reconstructing a map corresponding to the driving path; and wherein before performing multi-trajectory fusion on the second path trajectory and the first path trajectory, further comprising:

judging whether a coincidence degree between the second path trajectory and the first path trajectory is greater than or equal to a preset first threshold value; and if the coincidence degree between the second path trajectory and the first path trajectory is greater than or equal to the preset first threshold value, fusing the second path trajectory and the first path trajectory.

2. The path construction method according to claim 1, wherein generating a first path trajectory corresponding to the first vehicle travel state information based on the first travelable region further comprises:

constructing a map corresponding to the driving path based on the first path trajectory.

3. The path construction method according to claim 1, wherein the acquiring a first vehicle travel state information and an initial image of a surrounding environment of a driving path corresponding to the vehicle travel state information in real time comprises:

acquiring the first vehicle travel state information when the vehicle is traveling on the driving path in real time; and acquiring the first initial image of the surrounding environment of the driving path when the vehicle is traveling on the driving path in real time according to the travel strategy and the driving habit of the driver.

4. The path construction method according to claim 3, wherein acquiring the first travel strategy when the vehicle is traveling on the driving path comprises:

acquiring a vehicle speed and a steering wheel angle of the vehicle in real time;

determining a driving range and a heading angle of the vehicle based on the vehicle speed and the steering wheel angle of the vehicle; and determining the travel strategy of the vehicle from the driving range and the heading angle of the vehicle, the travel strategy of the vehicle including the driving range on the travelable road and whether to turn at the travelable intersection.

5. The path construction method according to claim 3, wherein acquiring the driving habit of the driver when the vehicle is traveling on the driving path comprises:

acquiring operation data of the vehicle when the vehicle is traveling on the driving path in real time, wherein the operation data of the vehicle comprises a steering angle of the vehicle, a steering acceleration, a speed of the vehicle, an acceleration of the vehicle, an accelerator pedal, and a brake;

pre-processing the operation data of the vehicle to obtain target operation data;

inputting the target operation data into a cyclic neural network, and extracting features of the target operation data from the cyclic neural network;

inputting the features into a full connection network, and predicting a driving habit of a driver when the vehicle is traveling on the driving path; and the driving habit including a traveling speed on a travelable road and a steering angle at a travelable intersection.

6. The path construction method according to claim 1, further comprising:

if the coincidence degree between the second path trajectory and the first path trajectory is less than a preset first threshold value, determining whether a matching degree between the second path trajectory and the driving path is less than a matching degree between the first path trajectory and the driving path; and if so, regenerating the second path trajectory.

7. The path construction method according to claim 1, wherein calculating a first target top view corresponding to the first initial image via a nonlinear difference correction algorithm according to the first initial image comprises:

obtaining a plurality of target images based on a plurality of first initial images, each target image comprises a top view of a region image coinciding with a region in which the first target top view is located;

acquiring a number of times the target image appears;

judging whether the number of times the target image appears is greater than or equal to a preset second threshold value; if so, extracting a feature point of the region image in each of the target images; and matching the feature points of each of the region images to reconstruct the first target top view.

8. The path construction method according to claim 1, wherein calculating a first target top view corresponding to the first initial image via a nonlinear difference correction algorithm according to the first initial image further comprises:

acquiring a corresponding relationship between a top view of the first initial image and the first initial image based on the non-linear difference correction algorithm, the corresponding relationship comprising corresponding coordinate points between the top view of the first initial image and the first initial image;

acquiring a target coordinate point from the first initial image based on the corresponding relationship; and constructing the first target top view corresponding to the first initial image based on the target coordinate point.

9. The path construction method according to claim 1, wherein generating a first path trajectory corresponding to the first vehicle travel state information based on the first travelable region further includes:

determining the travelable road, the travelable intersection, and a distribution of the travelable road and the travelable intersection in the travelable region based on the travelable region; and generating a first path trajectory corresponding to the first vehicle travel state information based on the distribution of the travelable road and the travelable intersection.

10. The path construction method according to claim 9, wherein before recognizing the travelable road, the travelable intersection, and the distribution of the travelable road and the travelable intersection in the first travelable region, further comprising:

scanning the partitioned image using a grid with a preset size to obtain the first travelable region and a scanned region of the vehicle; and adjusting the first travelable region based on the scanned region, and reconstructing the first travelable region.

11. The path construction method according to claim 10, wherein adjusting the first travelable region based on the scanned region, and reconstructing the first travelable region comprises:

performing an inflation operation on the first travelable region based on the scanned region to obtain an inflation region; and performing a corrosion operation on the inflation region based on the scanned region, and reconstructing the first travelable region.

12. The path construction method according to claim 9, wherein recognizing the travelable road, the travelable intersection, and the distribution of the travelable road and the travelable intersection in the first travelable region comprises:

inputting the first travelable region into a road recognition model, recognizing the travelable road in the first travelable region and information about the first travelable road, the information about the travelable road including a width and a length of the travelable road;

inputting the first travelable region into an intersection recognition model, and recognizing the travelable intersection in the first travelable region and a type of the travelable intersection; and determining a distribution of the travelable road and the travelable intersection in the first travelable region based on the first travelable region and the information about the travelable road in the travelable region and the type of the travelable intersection.

13. A path construction terminal, wherein the terminal comprises a processor and a memory, the memory having stored therein at least one instruction or at least one piece of program, the at least one instruction or the at least one piece of program being loaded and executed by the processor to implement the path construction method according to claim 1.

14. A computer-readable storage medium wherein the storage medium has at least one instruction or at least one piece of program stored therein, the at least one instruction or the at least one piece of program being loaded and executed by the processor to implement the path construction method according to claim 1.

15. The path construction terminal of claim 13, wherein generating a first path trajectory corresponding to the first vehicle travel state information based on the first travelable region further comprises:

constructing a map corresponding to the driving path based on the first path trajectory.

16. The path construction terminal of claim 13, wherein the acquiring first vehicle travel state information and an first initial image of a surrounding environment of a driving path corresponding to the first vehicle travel state information in real time comprises:

acquiring the first vehicle travel state information when the vehicle is traveling on the driving path in real time, the first vehicle travel state information including a travel strategy when the vehicle is traveling on the driving path and a driving habit of a driver; and acquiring the first initial image of the surrounding environment of the driving path when the vehicle is traveling on the driving path in real time according to the travel strategy and the driving habit of the driver.

* * * * *